Sept. 14, 1948.        C. R. HAIGHT        2,449,296
AUTOMATIC HYDRAULIC JACK
Filed Oct. 5, 1946        4 Sheets-Sheet 3
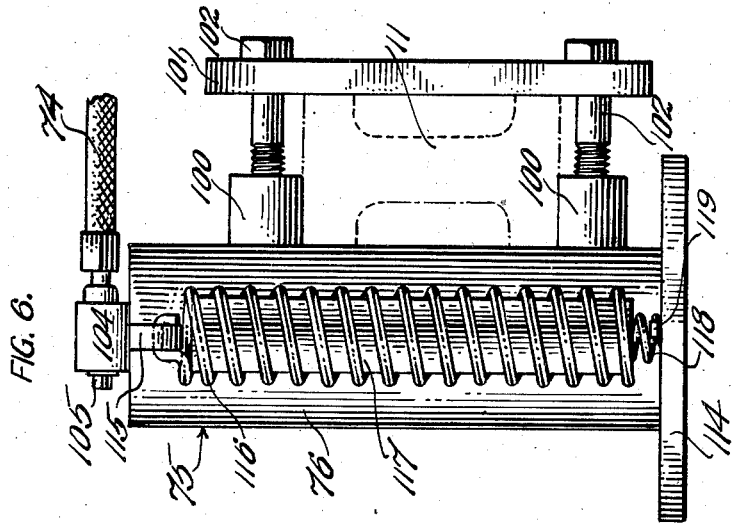
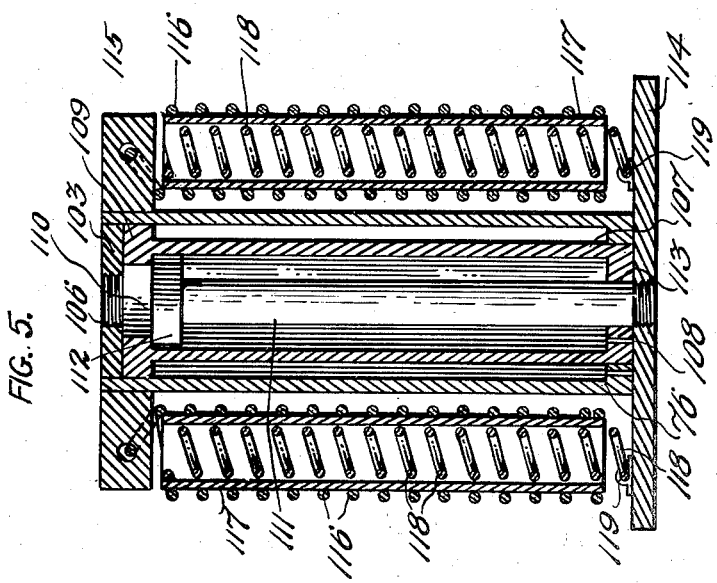
Inventor
CLARENCE R. HAIGHT.
By *Clarence A. O'Brien*
and *Harvey B. Jacobson*
Attorneys Sept. 14, 1948.  C. R. HAIGHT  2,449,296
AUTOMATIC HYDRAULIC JACK
Filed Oct. 5, 1946  4 Sheets-Sheet 4
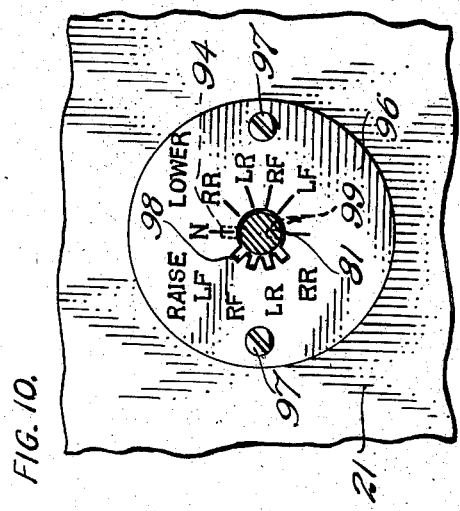
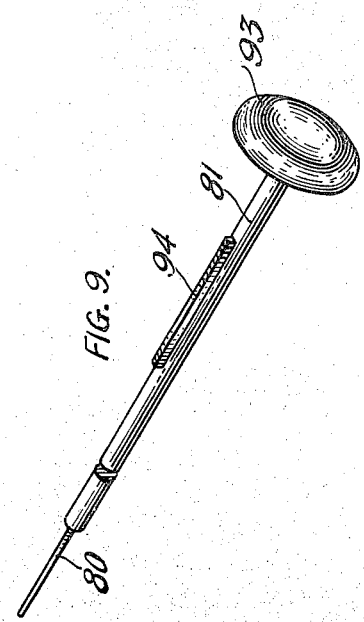
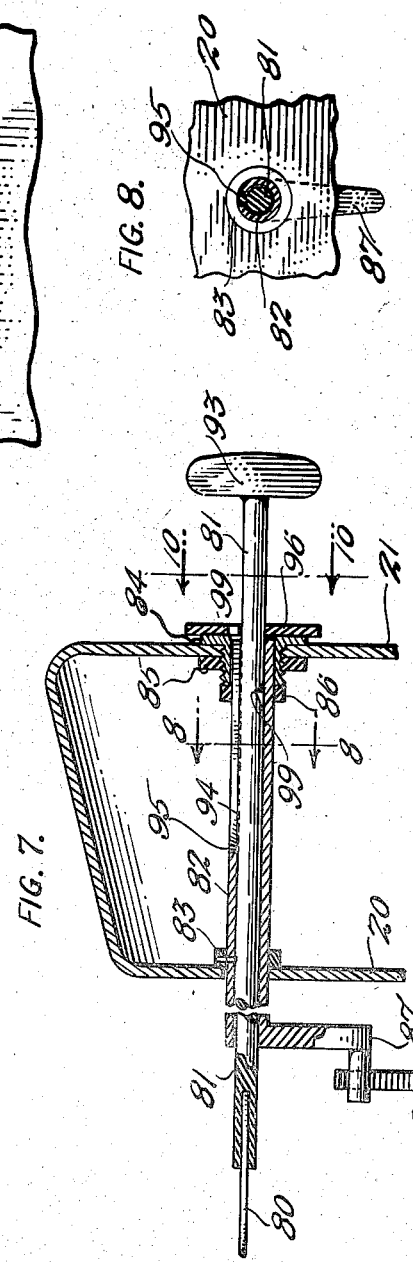
Inventor
CLARENCE R. HAIGHT.
By *Clarence A. O'Brien*
and *Harvey B. Jacobson*
Attorneys Patented Sept. 14, 1948

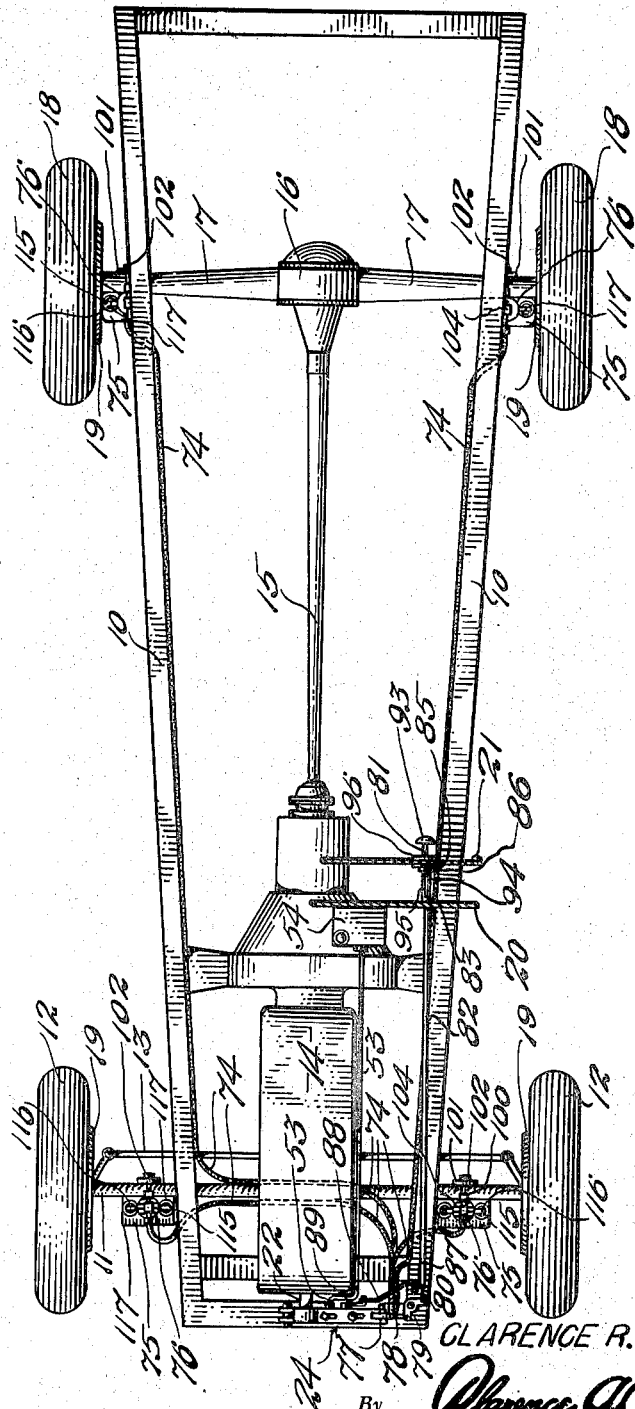

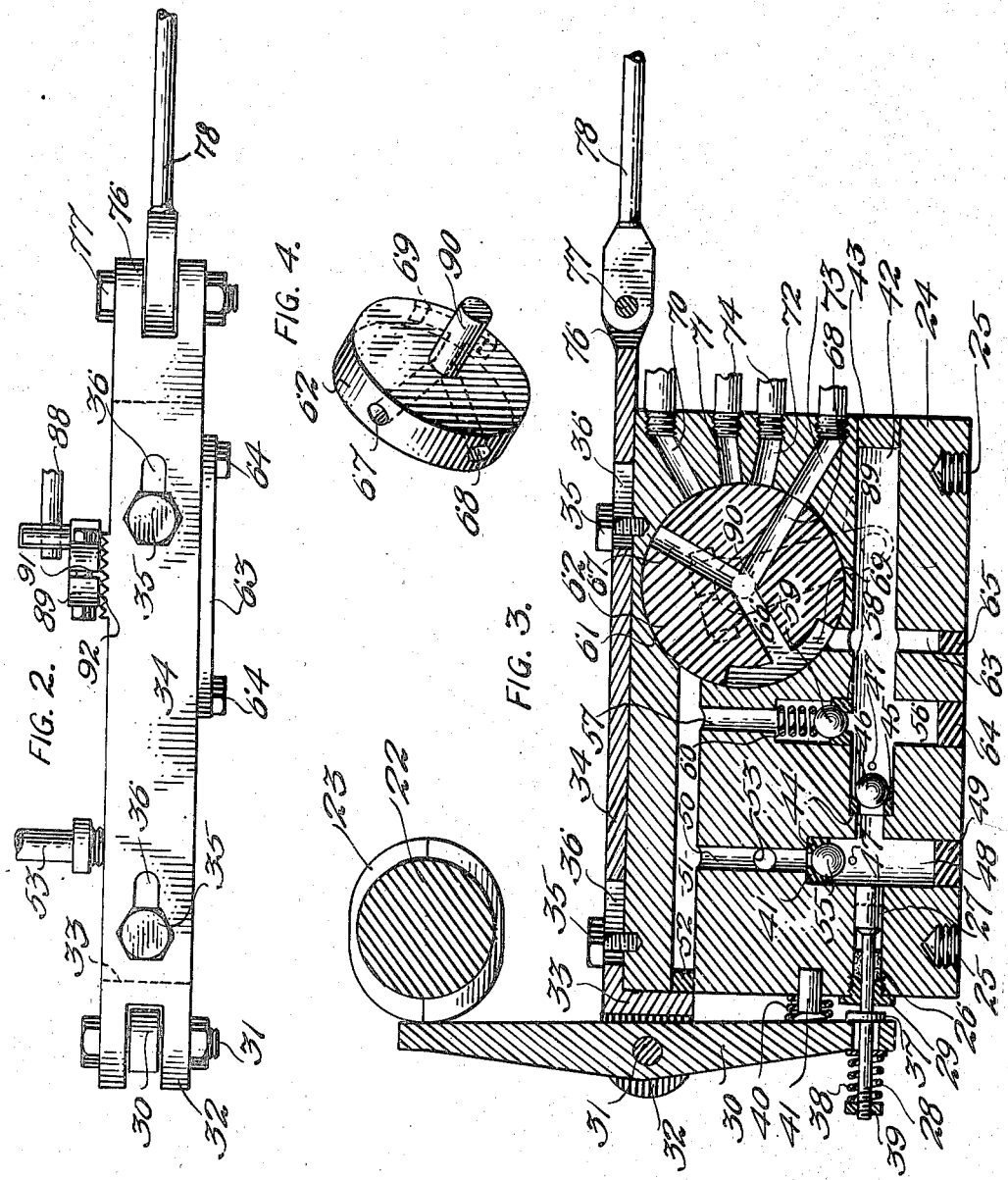

2,449,296

UNITED STATES PATENT OFFICE 2,449,296

AUTOMATIC HYDRAULIC JACK

Clarence R. Haight, Cut Bank, Mont., assignor of one-sixth to Vernon T. White, one-sixth to John B. Flugstad, and one-sixth to Lynn G. Clauson, all of Cut Bank, Mont.

Application October 5, 1946, Serial No. 701,592

5 Claims. (Cl. 254—86)

This invention relates to an automatic hydraulic jack for automobiles constituting a built-in unit designed to be operated at will for actuating a pump to supply fluid pressure for operating any one of a number of selected lifting devices or jacks provided on the automobile axles adjacent to each wheel, in order to lift any one of the wheels off of the ground by the hydraulic power supplied by the pump capable of control from the dash in the automobile, instead of using the ordinary manual jacks with the hazards incident thereto.

An object of the invention is to provide a simple and compact hydraulic jack arrangement, which may be driven from the front of the motor shaft of an automobile to operate a pump, which is controlled by means provided on the dash or instrument panel in convenient position to be manipulated by a driver or other person, to selectively operate any one of four jacks provided on the wheel axles adjacent to the wheels, to raise any one of the same off of the ground as desired for changing tires or other operations, said means being normally inoperative when not in use.

Another object of the invention is to provide a novel control means including a valve by which hydraulic pressure, either air or oil, may be supplied to any one of the jacks at the wheels, from the control means on the instrument board or panel at the dash, so that a pump driven by the automobile engine, will be operated to create the necessary hydraulic pressure, for operating the jacks, by a control device constituting a dual control means for connecting the pump and selecting and operatively connecting any one of the jacks at will.

Another object of the invention is to provide a jack which may be extended by hydraulic pressure to lift a wheel, and which automatically returns to a retracted and inoperative position.

Another object of the invention is to provide a lifting device or mechanism of the class described, which may be readily applied to various automobiles and constitutes a compact, simple and inexpensive hydraulic jack system for automobiles for raising any one of the wheels, which can be readily installed on any car and which offers the public a safe and convenient method of mechanically lifting the car.

Other objects and advantages reside in the details of construction and operation as more fully hereinafter described and claimed, reference being had to the accompanying drawings forming part hereof, wherein like numerals refer to like parts throughout, and in which:

Figure 1 is a plan view showing the chassis of an automobile equipped with the automatic hydraulic jack system in accordance with the invention.

Figure 2 is an enlarged plan view of a pump unit and control means therefor, constituting a part of the device.

Figure 3 is an enlarged central sectional view of the unit shown in Figure 2.

Figure 4 is a fragmentary perspective view of a valve constituting a master valve for controlling the selection of flow of hydraulic pressure to any one of the various jacks.

Figure 5 is an enlarged detailed sectional view of a jack.

Figure 6 is an end elevation of a jack as shown in Figure 5.

Figure 7 is an enlarged detailed sectional view showing the control means for operatively connecting the pump and operating the master valve for connecting the pressure supply to any one of the jacks provided adjacent the wheels.

Figure 8 is a detailed sectional view taken on the line 8—8 of Figure 7.

Figure 9 is a perspective view of a control plunger on the dash for controlling the operation of the pump and selective operation of the jacks, and Figure 10 is an enlarged sectional view taken on the line 10—10 of Figure 7.

Referring to the drawings in detail, in which like reference characters designate corresponding parts throughout the several views, 10 designates the chassis or frame of an automobile having the front axle 11 bearing the steering wheels 12 operated by the usual or any preferred steering mechanism 13 by the steering wheel of the automobile in the usual manner. The numeral 14 designates the motor or engine operatively supported on the frame and having the usual drive shaft 15 connected through the differential drive 16 through the rear axle housings 17 with the rear drive wheels 18, all four of the wheels being equipped with the usual brake mechanism generally indicated at 19. The front dash is indicated at 20 having the usual instrument board or panel 21 adjacent the driver's seat. All of this construction is conventional as provided on ordinary automobiles.

The engine or motor shaft 22 is extended forwardly and bears a two-part cam or eccentric 23 as a facility for mounting the same on the shaft. Mounted on the front of the frame in any convenient way, is a pump unit 24 comprising a casting or otherwise, of relatively rectangular flat plate-like form so as to be easily accommodated under the hood between the motor and radiator, transversely of the frame. This casting or block 24 may be provided with threaded sockets 25 at its bottom edge, for taking stud bolts, for mounting the device on the front of the frame or chassis, or other suitable means may be provided for this purpose. At one end, the block 24 is provided with a longitudinal bore 26 forming a cylinder in which a plunger or piston 27 is designed to reciprocate, the piston rod 28 thereof operating through a packing nut 29 and extending through one end of a rocker arm 30 pivoted at 31 intermediately on a fork or bearing bracket 32 provided at the adjacent end extending downwardly at right angles at the adjacent end of the casting or block 24 as indicated at 33 on a slide 34 mounted on the top edge of the block by means of stud bolts 35 extending through slots 36 in the slide 34, or otherwise suitably mounted to slide back and forth on the casting. The connection of the piston rod 28 with the rocker arm 30 is made by means of a stop or collar 37 with a spring 38 on the forwardly projecting end of the piston rod with an interposed washer and a nut 39, to effect adjustment of the tension of the spring 38 normally tending to hold the opposite end of the rocker arm disengaged from the cam or eccentric 23. The slide of slotted plate 34 when not held against the end of the block 24, by release of pull on said slide, is moved forwardly by means of a spring 40 interposed between the end of the block and the rocker arm 30 at its end connected to the plunger and retained in position by a pin 41, thus holding the rocker arm out of engagement with the cam or eccentric 23. This spring 40 also maintains the tension on the rocker arm, while engaged with the cam 23, when the slide or plate 34 is moved, to cause the free end of the rocker arm to engage the cam, thus maintaining constant contact of the rocker arm with the cam as the latter rotates, when the pump is operative.

The bore 26 forming the cylinder communicates with an enlarged bore 42 in line therewith and extending through the opposite end of the block 24 where it is closed by a plug 43. At the juncture of the bores 26 and 42, a shoulder 44 of annular form is provided against which is disposed a valve seat 45 engaged by a ball valve 46 forming a check valve and held from displacement when unseated by a stop or pin 47 so that the fluid pressure created upon the stroke of the piston or plunger 27 will be forced into the bore 42. Intersecting the bore 26 or pump cylinder at right angles, is a bore or passage 48 closed by a plug 49 at the bottom and communicating with a reduced inlet passage or bore 50 extending up into a longitudinal bore or passage 51 closed at one end by a plug 52, and with which communicates a pressure supply line 53 constituting an inlet from a fluid pressure storage tank 54 mounted on the dash 20 as shown in Figure 1 of the drawings. A check valve 55 similar to the check valve 46, is disposed at the juncture of the bores 48 and 50 and closes toward the latter and opens into the former, a similar annular shoulder forming a stop bearing a seat for the valve, together with a pin corresponding to the elements 44, 45 and 47 as described in connection with the check valve 46 and similarly numbered.

Spaced from the bores 48 and 50 are similar bores 56 and 57, except that the bore 50 is connected with the inlet 53 and is provided with a bore release valve at the juncture of the bores 56 and 57, with the bore 56 provided above the bore or passage 42 with a seat 58 against which a ball valve 59 is held by a spring 60 disposed at its opposite end against the shoulder formed by the juncture of the bores 56 and 57 and seating in the opposite direction with respect to the valve 55 to constitute a pressure relief valve in the cylinder and passage 42. The block 24 is provided at one side with a cylindrical valve chamber 61 of a master valve 62 in the form of a cylinder, the chamber being closed at one side by a plate 63 suitably bolted to the side or face of the block 24 as at 64, over the chamber 61 with which the inner end of the passage 51 communicates. An additional bore 63 provides an inlet port to the chamber 61 from the passage 42 in spaced relation to the passage 51 and the bores 56 and 63 are closed by plugs 64 and 65, the latter being of smaller diameter. The cylinder 62 of the master valve is provided with three separate ports or radial passages 66, 67 and 68 arranged in Y-shaped relation divergent from one another, the outer end of the port or passage 66 communicating with a peripheral passage or recess 69 in the cylinder of the valve 62, adapted to be placed in communication with either one of the passageways or ports 51 and 63 communicating with the pressure line from the tank and the pump cylinder through the passage 42 respectively. A plurality of divergent ports 70, 71, 72 and 73 lead from the chamber 61 toward the opposite side, and extend through the end of the block 24 for connection with fluid lines or tubes 74 extending to lifting units or hydraulic jacks 75 each of which is constructed as shown in Figures 5 and 6 of the drawings and is adapted to be bolted to the front axle and rear axle housings for raising any one or more of their respective wheels, in a manner to be hereinafter more fully described.

The opposite end of the slide or plate 34 with respect to that on which the rocker arm 30 is pivoted or has bearing, is pivotally connected at its forked end 76 as at 77, with the adjacent apertured end of a pull rod 78 which is pivotally connected to one arm of a bellcrank lever 79 having its opposite arm connected to a cable 80, the opposite end of which is anchored in the forward end of a plunger 81 through the forward end of a tube 82 rotatably mounted in the dash 20 and instrument panel 21 as shown in Figure 7 of the drawings. A collar 83 is mounted on the tube or tubular shaft 82 to take up end thrust in a forward direction against the dash 20 and the opposite end operates through a flanged nut 84 held in the panel wall 21 by a jam or locknut 85 and a thrust collar 86. One end of the tubular shaft 82 is provided with a crank arm 87 connected by a rod or link 88 with a split rocker arm 89 connected to the valve 62, such as at its pivot axis 90 at the axial center of the valve 62. The rocker arm 89 may have a rib 91 to enter between a plurality of radial grooves or notches 92 on the valve 62 or the face of the block 24 to hold the valve in place or in adjusted position when turned. The plunger 81 is provided with a knob 93 at its inner end adjacent the driver's seat, for conveniently manipulating it as a dual valve control, as well as controlling the operation of the pump. The plunger 81 is provided with a radial longitudinal rib 94 which is disposed through a slot 95 in the tube or tubular shaft 82 so that the latter may be turned by the knob 93 through the plunger 81 and cooperates with a dial plate 96 secured to the dash or panel 21 as at 97 and is provided with calibrations or markings indicating the positions to which the knob 91 is to be turned with the rib 94 as a pointer or key. As shown in Figure 10, the dial plate 96 is provided at one side of its axial opening receiving the plunger 81, with a plurality, preferably four notches or slots 98 extending radially therefrom at the side marked "Raise," beneath which are the designations LF, RF, LR and RR designating left front, right front, left rear and right rear, referring to the elevating or jack elements 75 adjacent the wheels 12 and 18 and the position to which the plunger 81 must be turned, to align the rib or key 94 with the notches or slots 98, in order to properly position the master valve 62 to connect the pump with the pipes or tubes 74 constituting conduits leading to said respective jacks. The other side of the dial plate is marked "Lower" and therebeneath, with the designations RR, LR, RF and LF, indicating the positions of the rib or key 94 as a pointer, or a supplementary pointer provided on the plunger 81, to permit release of the jacks by releasing the fluid pressure therein, to permit the jacks to lower the wheels at such points. It should be noted that these designations are the reverse of that at the left under the designation "Raise." It should also be noted that the rib or key 94 is limited in its rear movement against the back of the slot 95, to limit the inward or forward displacement of the plunger 81, and the plunger is designed to be held in its engaged position, by a suitable catch cooperating between the plunger 81 and the dial plate or other stationary part, as by having the plunger loose in its mounting and providing the same with a notch 99 to engage over the bottom edge of the dial plate aperture through which the plunger 81 operates, to hold the master valve in adjusted position. It will also be seen, that the plunger must be turned to the desired slot in order to move the key or rib therethrough in order to connect the pump by moving the slide 34 to cause the rocker arm 30 to engage the cam 23, after the master valve 62 has been set in the desired position, thus providing a dual control with both translation or longitudinal sliding movement or reciprocation, in addition to the rotatable control movement produced by turning the knob 93 and key 94. By sliding the plunger and moving the key back, the key may be turned to any other desired position or to align with any one of the notches or slots 98, so that any other jack may be brought into play. This is permitted by raising the plunger 81 to release the catch 99 from the dial plate. In the central position designated at N, the device is in a nil or inoperative position with the pump stationary and the pointer or key 94 extending in the direction of said designation N. By this means, any jack may be selected, and accurate selection and safety is insured, since the pump cannot be brought into working position or operatively connected to the cam until the master valve is lined up with a port, before the pump is operatively connected.

As will be noted from Figures 5 and 6 of the drawings, each jack assembly 75 comprises a cylinder 76 provided with means for clamping the same to the front axle 11 and the rear axle housing 17 adjacent the wheels, and as shown, is provided with upper and lower threaded sockets 100 between which the axle or axle housings are disposed in connection with a bracket construction including a plate 101 apertured to receive cap screws or stud bolts 102 which are threaded into the sockets 100, to clamp the jacks to the axles. In the head 103 of the cylinder 76, the conduits or tubes 74 are connected to a coupling 104 provided with a bleeder valve or plug 105, the coupling or fitting 104 being screwed into a threaded bore 106 constituting an inlet to the chamber of the cylinder 76 at the top. Within the cylinder, are two telescoping members including an inner cylinder 107, which like the cylinder 76, is provided with an air vent or bleed duct 108 at the bottom. The cylinder 107 is provided with an enlarged head 109 flanged outwardly to snugly fit within the bore of the cylinder 76 and a central opening 110 communicating with the threaded inlet 106 for the entrance of fluid under pressure. The telescopic jack assembly further includes a plunger or stem 111 having its head 112 enlarged and snugly fitting within the bore of the cylinder 107 and having its lower end operating through a bore 113 in the bottom of the cylinder 107, for connection with a base plate 114 adapted to engage the ground. When the fluid pressure enters the outer cylinder 76, it forces downwardly on the head 112, lowering the plate or base 114, which upon engagement with the closed lower end of the inner cylinder 107, causes the latter to travel downwardly within the outer cylinder 76, and its parts are thereby extended to raise the axle and wheel off of the ground adjacent to the point at which the jack is provided. The parts are shown telescoped in Figures 5 and 6 of the drawings, when the inner cylinder 107 moves upwardly into the outer cylinder 76 and the plunger or stem 111 moves upwardly until the head 112 thereof engages under the head 109 of the inner cylinder 107, thereby contracting the device to a very compact size.

At diametrically opposite points, the cylinder 76 is provided with apertured ears or lugs 115 extending in opposite directions, for attachment of the corresponding upper ends of coil springs 116 over the projecting ends of the base 114, the lower ends of the springs 116 being rigidly attached as by welding to the lower ends of tubes 117, over which the springs 116 extend. Within the upper ends of the tubes, the upper ends of smaller coil springs 118 are rigidly connected as by welding, and extend downwardly through the tubes 117 for connection to the base plate 114, as indicated at 119, by means of straps, welding or otherwise. In this way, the tubes 117 serve as supporting means for the springs 118 and provide resilient connections between the upper end of the cylinder 76 at the apertured lugs or ears 115 with the base plate 114, designed to be extended or telescoped in lowering the jacks to raise the wheels off of the ground or in raising the jacks to permit lowering of the wheels or dropping thereof to the ground. Obviously, when pressure is released from behind the plungers 111 and the cylinders 107, the springs will normally retract and raise the base plates of the jacks to permit the wheels to drop to the ground.

In the operation of the device and system as described, the operator merely grasps the knob 93 and turns the same to the desired designation at the left of the dial, selecting the wheel to be raised from the ground. By turning the knob 81 and plunger 81 so that the key or rib 94 will enter the desired slot or notch 98, the master valve 62 is turned by its connection with the crank arm 87 and tubular control member 82, at the link 88 so that one of the ports 67 and 68 may be brought into alignment with one of the conduits 74 to be selected at the passages or ports 70, 71, 72 or 73.

In the position shown in Figure 3, the port 68 is connected to the port 73 and the port 66 is connected through the peripheral port or recess 69 with the port 63, so that by pulling outwardly on the knob 93, and plunger 81 together with cable or rod 80, the slide 34 is moved to permit the rock arm 30 to engage the cam 23, and with the motor or engine 14 operating, reciprocation is imparted to the plunger or piston 27 of the pump, to create the necessary fluid pressure to operate the jack and raise the wheel by lowering its base plate 114, forcing the plunger 111 and cylinder 107 downwardly into extended positions from the telescoped position shown in Figure 5 when the parts are collapsed, against the action of the springs 116 and 118. The compressed fluid may also pass into the passage 51 through the release valve 59 so that compressed air or fluid is stored in the tank 54, which may enter the passage 50 through the inlet 53 when necessary at the check valve 55 which prevents the return thereof. This air is further supplied through the check valve 46, which opens at each compression stroke of the plunger or piston 27 while the valve 59 only opens to relieve excess pressure which is forced into the tank through the passages 50 and 51 and inlet 53 through the pipe or conduit connecting the latter to the tank. When it is desired to lower the wheel, the operator pushes inwardly on the plunger 81 and knob 93, to disconnect the pump by moving the slide 34 to disengage the rocker arm 30 from the cam 23, assisted by the spring 40 and then by turning the knob with the key or rib 94 in back of the dial plate 96, the master valve 62 is turned to align the port 60 with the port 51 at the port 69 and the port 68 or 67 with another one of the ports 70, 71, 72 or 73, to release the air pressure from behind the plunger of the jack which has been operated, which returns to a telescoped or collapsed position under the action of the springs 116 and 118 thereof. This of course is assisted by the weight of the car, which will force the fluid through the port or channel 67 into the passage 51 which leads to the inlet and back to the storage tank on the front of the dash of the car. In case the jacks are fully extended, the relief valve 59 acts as a safety device to prevent the same from being subjected to further pressure. Some of this pressure may also be released past the piston or plunger 27 of the cylinder 26. Thus, by connecting the air pressure either from the pump or the storage tank to any one of the respective jacks, by turning the key or pointer of the dial to the desired jack at its notch or slot 98, any one of the jacks may be operated and lowered, to raise the wheel desired and selected by the operator. The release is simply operated by turning the plunger or pointer on the dial, to the desired release designation, thus insuring safety at all times and obviating the necessity of manually lifting the wheels off of the ground by means of the usual hand operated jacks. Thus, the engine or motor in addition to operating to provide the necessary power for propulsion, lighting, heating, cooling, etc., also supplies power controlled by the operator from the dash, for actuating the jacks and for the release thereof to raise and lower the wheels.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. An automatic hydraulic jack for automobiles comprising the combination in an automobile and its engine, a pump unit having a rocker arm, a cam on the engine shaft with respect to which the rocker arm is normally disengaged, a master valve communicating with the pump, hydraulic pressure operated jacks mounted on the automobile axles adjacent the wheels and having plunger operated elements adapted to be lowered into engagement with the ground for raising the axles and wheels, connections between the pump through said master valve with said jacks, said jacks being normally retracted, and dual means for connecting and disconnecting the pump and operating said selector valve to connect the pump and hydraulic pressure supply to the respective jacks at the wheels.

2. An automobile hydraulic jack comprising the combination with the automobile having an engine and front and rear axles with wheels mounted thereon, hydraulic jacks removably clamped to the axles adjacent the wheels and having normally retracted movable bases and plungers, a pump unit mounted at the front of the automobile frame and motor, a cam on the motor shaft, a rocker arm for actuating the pump and slidably mounted to move into and out of engagement with the cam, means normally disengaging said rocker arm from the cam, said pump unit including a block having a cylinder and a piston connected to the rocker arm operating in said cylinder, passages leading from the block through conduits to the respective jacks, a storage tank connected to the pump, check valves controlling the supply of fluid to and from the jacks and storage tank, a master valve controlling said supply, means for actuating said slide and master valve from the dash of the automobile, to selectively supply the hydraulic pressure to any one of said jacks at will or for exhausting said pressure therefrom to permit retraction of the jacks, said pressure when forced into the jacks causing the lowering thereof to raise its respective wheel, and means for locking said selecting means in selected position.

3. The combination with an automobile having the usual motor, front and rear axles and wheels, hydraulic jacks mounted on the axles adjacent the wheels and including telescoping plungers having base plates adapted to be lowered to the ground under hydraulic pressure, telescopic spring elements adapted to retract said jacks normally, a pump unit including a block with a cylinder, a piston movable therein, a rocker arm, a cam on the engine shaft of the automobile for engagement with said rocker arm, means for slidably supporting said rocker arm, and movable from the dash of the automobile, means for actuating said slide at said dash, a plurality of conduits leading from the pump to said jacks, a master valve controlling the supply of fluid pressure from the pump to any one of said jacks, means on the dash operated in dual connection with the slide operating means by rotative movement, to actuate the master valve to a selected position or for changing the position thereof to exhaust the hydraulic pressure from any one of said jacks to permit retraction thereof, means for locking said actuating means in set position selected, and means for indicating the selected position.

4. The combination with an automobile having the usual motor, front and rear axles and wheels, hydraulic jacks mounted on the axles adjacent the wheels and including telescoping plungers having base plates adapted to be lowered to the ground under hydraulic pressure, telescopic spring elements adapted to retract said jacks normally, a pump unit including a block with a cylinder, a piston movable therein, a rocker arm, a cam on the engine shaft of the automobile for engagement with said rocker arm, means for slidably supporting said rocker arm, and movable from the dash of the automobile, means for actuating said slide at said dash, a plurality of conduits leading from the pump to said jacks, a master valve controlling the supply of fluid pressure from the pump to any one of said jacks, means on the dash operated in dual connection with the slide operating means by rotative movement, to actuate the master valve to a selected position or for changing the position thereof to exhaust the hydraulic pressure from any one of said jacks to permit retraction thereof, means for locking said actuating means in the set position selected, said dual actuating means comprising a plunger, a tubular member in which said plunger is adapted to operate, said plunger being slidable to actuate the slide for connecting the pump to the motor, said tubular member adapted to rotate and having connection with the valve for actuating the latter, and means for rotating and sliding the plunger in selected position for operating any one of the jacks and locking the same in selected position.

5. The combination with an automobile having the usual motor, front and rear axles and wheels, hydraulic jacks mounted on the axles adjacent the wheels and including telescoping plungers having base base plates adapted to be lowered to the ground under hydraulic pressure, telescopic spring elements adapted to retract said jacks normally, a pump unit including a block with a cylinder, a piston movable therein, a rocker arm, a cam on the engine shaft of the automobile for engagement with said rocker arm, means for slidably supporting said rocker arm, and movable from the dash of the automobile, means for actuating said slide at said dash, a plurality of conduits leading from the pump to said jacks, a master valve controlling the supply of fluid pressure from the pump to any one of said jacks, means on the dash operated in dual connection with the slide operating means for rotative movement, to actuate the master valve to a selected position or for changing the position thereof to exhaust the hydraulic pressure from any one of said jacks to permit retraction thereof, means for locking said actuating means in the set position selected, said dual actuating means comprising a plunger, a tubular member in which said plunger is adapted to operate, said plunger being slidable to actuate the slide for connecting the pump to the motor, said tubular member adapted to rotate and having connection with the valve for actuating the latter, said tubular member having a slot and said plunger having a key adapted to enter said slot, a dial plate having notches indicating the selected positions to which the plunger and tubular member are turned to receive the key and marked to indicate the selected jacks and release positions thereof.

CLARENCE R. HAIGHT.

REFERENCES CITED

The following references are of record in the file of this patent:

UNITED STATES PATENTS

| Number | Name | Date |
|---|---|---|
| 1,952,127 | Goldman | Mar. 27, 1934 |
| 2,194,594 | Halley | Mar. 26, 1940 |
| 2,233,732 | Campbell | Mar. 4, 1941 |
| 2,237,167 | Skavinsky | Apr. 1, 1941 |